United States Patent
Oota

(10) Patent No.: US 9,085,233 B2
(45) Date of Patent: Jul. 21, 2015

(54) ATTACHMENT STRUCTURE FOR ADJUSTABLE AIR DIFFUSER

(71) Applicant: Fuji Jukogyo Kabushiki Kaisha, Tokyo (JP)

(72) Inventor: Kazuhiro Oota, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/026,440

(22) Filed: Sep. 13, 2013

(65) Prior Publication Data

US 2014/0090911 A1    Apr. 3, 2014

(30) Foreign Application Priority Data

Sep. 28, 2012 (JP) ................................. 2012-215473

(51) Int. Cl.
*B60K 11/00* (2006.01)
*B60K 11/08* (2006.01)

(52) U.S. Cl.
CPC ........... *B60K 11/085* (2013.01); *B60Y 2306/01* (2013.01)

(58) Field of Classification Search
CPC ...... B60K 11/08; B60K 11/04; B60K 11/085; B60K 11/00
USPC .............................. 180/68.3, 68.1, 68.6, 68.2
See application file for complete search history.

(56) References Cited

U.S. PATENT DOCUMENTS

| | | | |
|---|---|---|---|
| 7,887,125 B2 | 2/2011 | Tazaki et al. | |
| 8,128,153 B2 | 3/2012 | Bernt et al. | |
| 8,181,727 B2 * | 5/2012 | Ritz et al. | 180/68.1 |
| 8,292,014 B2 * | 10/2012 | Sugiyama | 180/68.1 |
| 8,485,296 B2 * | 7/2013 | Charnesky et al. | 180/68.1 |
| 8,517,130 B2 * | 8/2013 | Sakai | 180/68.1 |
| 8,561,738 B2 * | 10/2013 | Charnesky et al. | 180/68.1 |
| 8,646,552 B2 * | 2/2014 | Evans et al. | 180/68.1 |
| 2010/0243352 A1 * | 9/2010 | Watanabe et al. | 180/68.1 |
| 2012/0022742 A1 | 1/2012 | Nemoto | |
| 2012/0090906 A1 * | 4/2012 | Charnesky et al. | 180/68.1 |
| 2012/0312611 A1 * | 12/2012 | Van Buren et al. | 180/68.1 |
| 2013/0146375 A1 * | 6/2013 | Lee | 180/68.1 |
| 2013/0268164 A1 | 10/2013 | Sugiyama | |
| 2014/0084624 A1 | 3/2014 | Kojima et al. | |
| 2014/0090911 A1 | 4/2014 | Oota | |

FOREIGN PATENT DOCUMENTS

| | | |
|---|---|---|
| EP | 1 762 437 B1 | 12/2010 |
| JP | 2007-1503 | 1/2007 |
| JP | 2007-1503 A | 1/2007 |
| JP | 2007-069825 | 3/2007 |
| JP | 2008-179342 | 8/2008 |
| JP | 2011-068292 | 4/2011 |

OTHER PUBLICATIONS

U.S. Appl. No. 14/026,395, filed Sep. 13, 2013, Kojima, et al.

* cited by examiner

*Primary Examiner* — Hau Phan
(74) *Attorney, Agent, or Firm* — Smith, Gambrell & Russell, LLP

(57) ABSTRACT

An adjustable air diffuser is disposed in an airflow channel into which travelling wind is directed through an opening provided in a bumper face. The diffuser substantially opens and closes the airflow channel by using a movable louver blade driven by an actuator. An upper part of the diffuser is disposed to face a rear wall of the bumper face and is attached to a bumper beam extending substantially along a vehicle width direction. A lower part of the diffuser is either one of attached to a vehicle body structural member and a load transmission member projecting forward from the vehicle body structural member. The upper part of the diffuser and the bumper beam are connected with each other with an upper bracket having a weak portion that is configured to be broken in response to pivotal movement of the diffuser relative to the bumper beam.

13 Claims, 8 Drawing Sheets

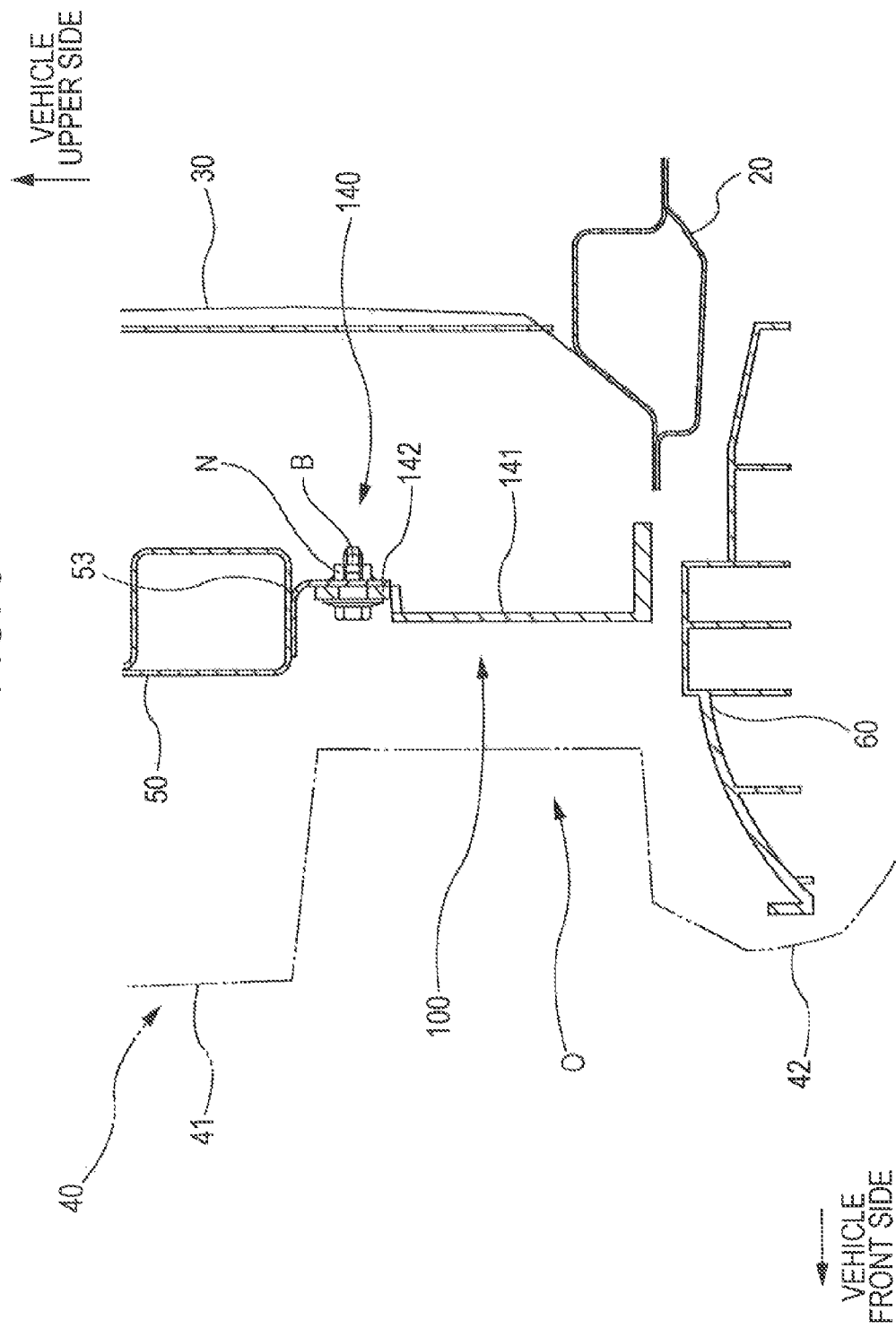

ATTACHMENT STRUCTURE FOR ADJUSTABLE AIR DIFFUSER

CROSS-REFERENCES TO RELATED APPLICATIONS

The present application claims priority from Japanese Patent Application No. 2012-215473 filed on Sep. 28, 2012, the entire contents of which are hereby incorporated by reference.

BACKGROUND

1. Technical Field

The present invention, relates to an attachment structure for an adjustable air diffuser that opens and closes an airflow channel in a vehicle by movable louver blades. More particularly, the present invention relates to an attachment structure that prevents an adjustable air diffuser from causing any damage to other members of a vehicle body when a vehicle is in a collision.

2. Description of the Related Art

In a vehicle such as an automobile, travelling wind is directed into slatted openings provided in a bumper face that is an exterior component disposed on a front end of the vehicle in order to cool a radiator and a condenser for an air conditioning system.

Recently, in order to reduce the air resistance of a moving vehicle and suppress fuel consumption, an adjustable air diffuser (a variable flow duct) has been proposed. The adjustable air diffuser shuts a cooling wind flow by using movable louver blades when a cooling load is relatively low. An example of such an adjustable air diffuser is disclosed in Japanese Unexamined Patent Application Publication No. 2007-1503.

The adjustable air diffuser as described above has a relatively strong structure among the members provided on the front part of the vehicle. Therefore, when the adjustable air diffuser moves backward along with the bumper beam and the like relative to the other members at the time of a collision of the vehicle, the adjustable air diffuser may interfere with the other members such as a radiator core, a condenser for an air conditioner, and a radiator panel that supports the members and that the adjustable air diffuser causes damage to the members and the radiator panel.

SUMMARY OF THE INVENTION

Accordingly, it is an object of the present invention to provide an attachment structure for an adjustable air diffuser that is capable of preventing damage to another member of a vehicle at the time of a collision.

A first aspect of the invention provides an attachment structure for an adjustable air diffuser that is disposed in an airflow channel into which travelling wind is directed through an opening provided in a bumper face and that substantially opens and closes the airflow channel by using a movable louver blade driven by an actuator. An upper part of the adjustable air diffuser is disposed to face a rear wall of the bumper face and is attached to a bumper beam extending substantially along a vehicle width direction. A lower part of the adjustable air diffuser is attached to either one of a vehicle body structural member and a load transmission member projecting forward from the vehicle body structural member. The upper part of the adjustable air diffuser and the bumper beam are connected with each other through an upper bracket having a weak portion that is configured to be broken in response to pivotal movement of the adjustable air diffuser relative to the bumper beam.

The lower part of the adjustable air diffuser and the either one of the vehicle body structural member and the load transmission member may be connected with each other through a lower bracket that is configured to be separated from the either one of the vehicle body structural member and the load transmission member in response to backward movement of the either one of the vehicle body structural member and the load transmission member relative to the adjustable air diffuser.

A second aspect of the invention provides an attachment structure for an adjustable air diffuser that is disposed in an airflow channel into which travelling wind is directed through an opening provided in a bumper face and that substantially opens and closes the airflow channel by using a movable louver blade driven by an actuator. An upper part of the adjustable air diffuser is disposed to face a rear wall of the bumper face and is attached to a bumper beam extending substantially along a vehicle width direction. A lower part of the adjustable air diffuser is attached to either one of a vehicle body structural member and a load transmission member projecting forward from the vehicle body structural member. The lower part of the adjustable air diffuser and the either one of the vehicle structural member and the load transmission member are connected with each other through a lower bracket that is configured to be separated from the either one of the vehicle structural member and the load transmission member in response to backward movement of the either one of the vehicle structural member and the load transmission member relative to the adjustable air diffuser.

In the attachment structure for the adjustable air diffuser according to the first or second aspect, a connecting portion between the upper part of the adjustable air diffuser and the bumper beam may be disposed near a connecting portion between a vehicle frame and the bumper beam.

In the attachment structure for the adjustable air diffuser according to the first or second aspect, the adjustable air diffuser may include a movable louver blade that pivots around an axis extending substantially along a vehicle width direction and a part of which projects backward when the movable louver blade is disposed in an open position. An end of the movable louver blade in the vehicle width direction may be disposed so as to overlap a supporting member that supports at least either one of a side end of a radiator core and a side end of a condenser for an air conditioner in a vehicle front side.

In the attachment structure for the adjustable air diffuser according to the first or second aspect, the adjustable air diffuser may include a driver a part of which projects backward. The driver may be disposed at a position substantially deviated from the supporting member that supports at least either one of a side end of a radiator core and a side end of a condenser for an air conditioner in a vehicle front side.

BRIEF DESCRIPTION OF THE DRAWINGS

FIG. 3 is a cross sectional view of the front part of the vehicle, the view taken in the direction of arrows III-III in FIG. 1;

DETAILED DESCRIPTION

An object of the invention is to provide an attachment structure for an adjustable air diffuser that prevents damage to other members of a vehicle at the time of a collision. The object is accomplished by supporting an upper part of a variable flow duct (an adjustable air diffuser) on a bracket that breaks in response to an input load in a torsional direction and by supporting a lower part of the variable flow duct on a bracket that can fall down from the variable flow duct when an energy absorption (EA) bracket moves backward.

Example

An example of an attachment structure for an adjustable air diffuser will be described below.

The attachment structure for the adjustable air diffuser according to the example of the invention is provided on a vehicle front end of, for instance, an automobile such as a passenger car.

Figure 1:
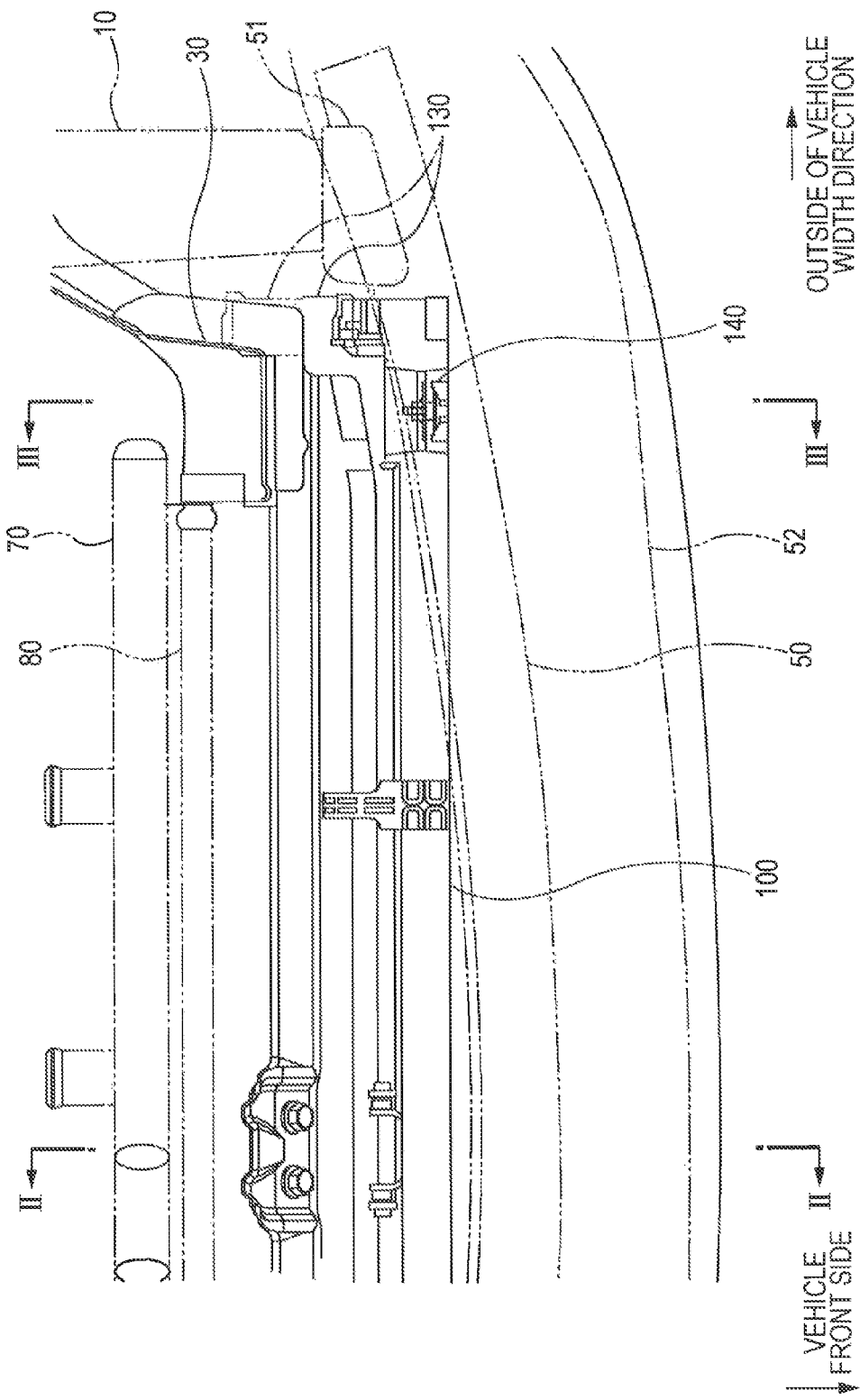
FIG. 1 is an explanatory plan view of a front part of a vehicle provided with an attachment structure for an adjustable air diffuser according to an example of the invention.
Figure 2:
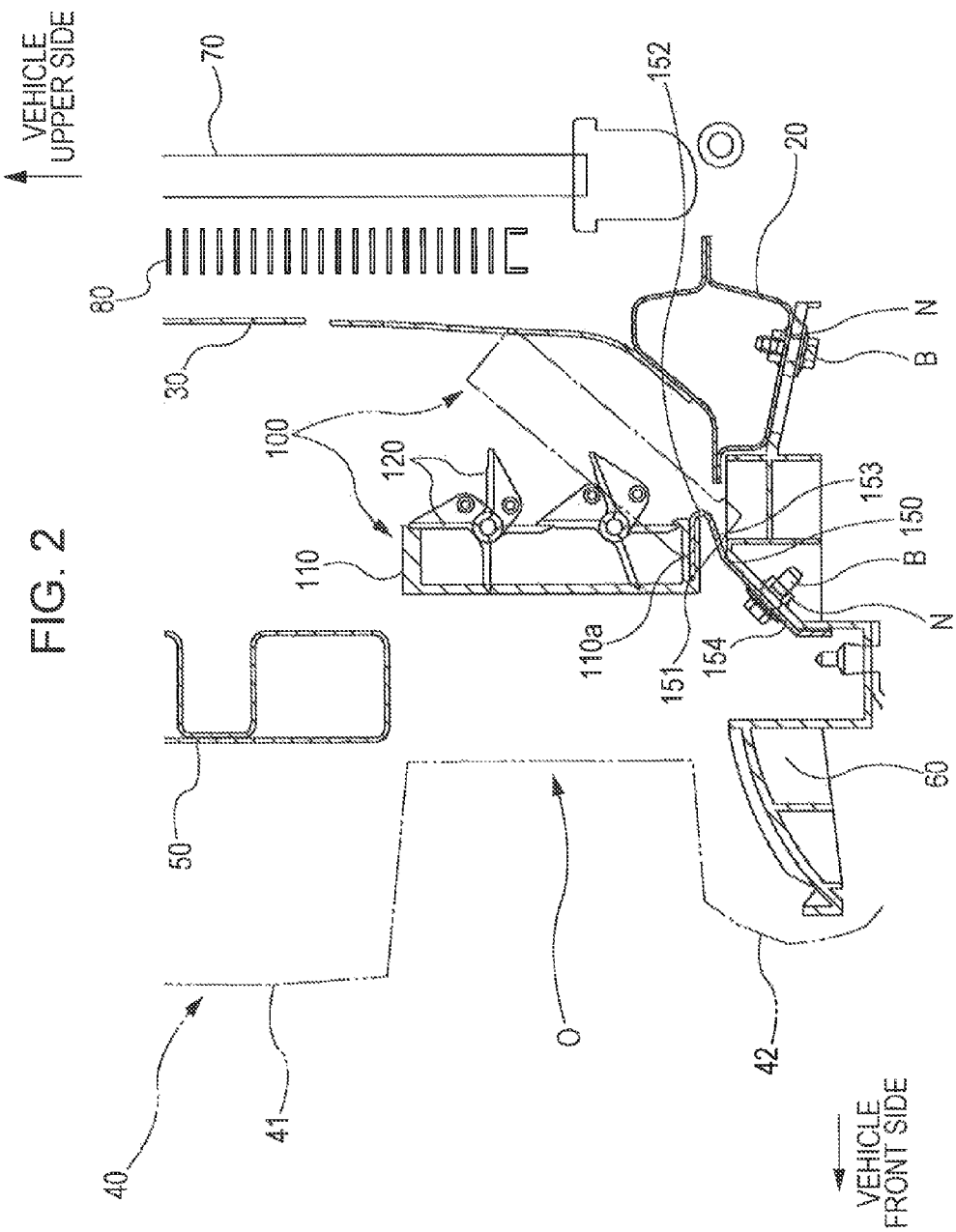
FIG. 2 is a cross sectional view of the front part of the vehicle, the view taken in the direction of arrows in FIG. 1.

FIG. 1 is an explanatory plan view of a front part of a vehicle provided with an attachment structure for an adjustable air diffuser according to the example of the invention. FIG. 2 is a cross sectional view of the front part of the vehicle, the view taken in the direction of arrows in FIG. 1. FIG. 3 is a cross sectional view of the front part of the vehicle, the view taken in the direction of arrows III-III in FIG. 1.

The vehicle includes, for instance, a front side frame 10, a radiator panel lower member 20, a radiator panel side member 30, a bumper face 40, a bumper beam 50, an energy absorption (EA) bracket 60, a radiator core 70, a condenser 80, a variable flow duct 100, and the like.

The front side frame 10, the radiator panel lower member 20, and the radiator panel side member 30 constitute a part of a body-in-white (an unequipped vehicle body). They are formed by assembling panels made of pressed-molded steel sheets, using spot-welding, for instance.

The front side frame 10 is a beam-like member that projects from a toe board at a front end of a cabin (not illustrated) toward a front side of the vehicle. The front side frame 10 has a closed hollow space in cross section when viewed along a front side of the vehicle. The front side frame 10 is disposed on left and right sides of an engine compartment (not illustrated). A sub-frame not illustrated) that is an attachment base for the engine and front suspension is attached to the front side frame 10.

The radiator panel lower member 20 supports lower ends of the radiator core 70 and the condenser 80. The radiator panel lower member 20 has a beam-like shape that extends along lower part of the radiator core 70 and the like in a vehicle width direction. The radiator panel lower member 20 is disposed at a position lower than the front side frame 10. The radiator panel lower member 20 is formed by welding a pair of upper and lower panels made of press-molded steel sheets so that the radiator panel lower member 50a has a hollow closed cross section.

The radiator panel side member 30 supports side ends of the radiator core 70 and the condenser 80. The radiator panel side member 30 has a column-like shape and extends upward from a side end of the radiator panel lower member 20. As illustrated in FIG. 1, the radiator panel side member 30 is disposed inside the front side frame 10 in the vehicle width direction.

The bumper face 40 is made of a resin such as polypropylene (PP) and is an exterior component exposed outside the vehicle. The bummer face 40 has a main body 41, an air dam 42, and the like that are integrated with one another.

The main body 41 is disposed adjacent to lower sides of headlamps and a front grille (not illustrated). The main body 41 extends substantially along the vehicle width direction and is curved so that a central part of the main body 41 in the vehicle width direction projects forward in a bulged shape. The main body 41 is curved or bent so that the front side of the main body 41 projects forward in a bulged shape in cross section when viewed along the vehicle width direction.

The air dam 42 is disposed under and is spaced apart from the main body 41. The air dam 42 extends substantially along the vehicle width direction and is curved so that a central part of the air dam in the vehicle width direction projects forward in a bulged shape. The air dam 42 is curved or bent so that the front side of the air dam 42 projects forward in a bulged shape in cross section taken along the vehicle width direction. An opening O is defined between the main body 41 and the air dam 42 so as to direct a wind that occurs when the vehicle is travelling (hereinafter referred to "a travelling wind").

The bumper beam 50 is a beam-like member that is provided behind the main body 41 of the bumper face 40 and extends substantially along the vehicle width direction. The bumper beam 50 absorbs an input load from the front side of the vehicle upon a collision while the bumper beam 50 is deforming, and transmits the input load to the front side frame 10. The bumper beam 50 is formed into a beam-like shape that has a closed cross section by coupling and welding pressed panels made of a steel sheet to each other or by roll forming or extruding. The bumper beam 50 is curved in accordance with the produced shape of the bumper face 40 so that the front side of the bumper beam 50 projects forward in a bulged shape.

The bumper beam 50 is coupled to a front end of the front side frame 10 through a stay 51 that projects from the rear side face of the bumper beam 50. An energy absorption (EA) foam 52 made of a porous resin-based material is attached to the front side of the bumper beam 50 (the foam 52 is omitted in FIGS. 2 and 3 but is illustrated in FIGS. 1, 6A, 6B, 7A, 7B, and 7C). Upon a collision of the vehicle, the EA foam 52 absorbs energy by being pinched between the main body 41 of the bumper face 40 and the bumper beam 50 and broken by pressure. A bracket 53 is provided on the lower part of the bumper beam 50. An upper bracket 140 of a variable flow duct 100 is coupled to the bracket 53. This will be described later in detail.

The EA bracket 60 is disposed behind the air dam 42 of the bumper face 40. The EA bracket 60 receives a backward load from the air dam 42 and transmits the backward load to the vehicle body while the EA bracket 60 is being broken and is absorbing the backward load. The EA bracket 60 is made by, for instance, injection-molding a resin-based material such as polypropylene (PP). An example of the EA bracket 60 has front-back direction ribs and vehicle width direction ribs that project downward from a top wall of the EA bracket 60. The front end of the EA bracket 60 is inserted into the air dam 42 from the rear side thereof. The rear end of the EA bracket 60 is coupled to a bottom wall of the radiator panel lower member 20 by bolts or the like. In the case where the EA bracket 60 receives a load over the predetermined value from the front side of the vehicle upon a collision or the like, the EA bracket 60 falls down from the radiator panel lower member 20 and moves downward and backward so as to sink below the radiator panel lower member 20 (see FIG. 7C).

The radiator core 70 is a heat exchanger that cools cooling water in an engine (not illustrated) by exchanging heat with the travelling wind. The radiator core 70 has tubes through which the cooling water flows and around which fins are provided. The radiator core 70 has a panel-like shape on the whole. The radiator core 70 is disposed immediately in front of the engine (not illustrated) so as to face the vehicle front side and stand substantially straight.

The condenser 60 is a heat exchanger that cools and condenses a vapor phase coolant for an air conditioner (not illustrated) by exchanging heat with the travelling wind. The condenser 80 has tubes through which a coolant flows and around which fins are provided. The condenser 80 has a panel-like shape on the whole. The condenser 60 is disposed immediately in front of the radiator core 70 and behind the bumper beam 50 and the variable flow duct 100 so as to face the vehicle front side and stand substantially straight.

The radiator panel side member 30 mentioned above is disposed along the side ends of the radiator core 70 and the condenser 80. The front end of the radiator panel side member 30 is disposed closer to a vehicle front side than the face of the condenser 80. The radiator panel lower member 20 is disposed along the lower ends of the radiator core 70 and the condenser 80. The front end of the radiator panel lower member 20 is disposed closer to the vehicle front side than the condenser 80.

The variable flow duct 100 is disposed behind the opening O defined between the main body 41 of the bumper face 40 and the air dam 42. The variable flow duct 100 serves as the adjustable air diffuser and substantially opens and closes a flow channel for the travelling wind that is directed through the opening O into the condenser 80 and the radiator core 70. The variable flow duct 100 improves the aerodynamic characteristics of the vehicle and suppresses fuel consumption by closing the flow channel for the travelling wind in the case of a relatively low cooling load. The variable flow duct 100 includes a frame 110, louver blades 120, a driver 130, and the like. The variable flow duct 100 is supported by an upper bracket 140 and a lower bracket 150.

The frame 110 has a laterally elongated rectangular shape when viewed from the vehicle front side and the interior of the frame 110 defines the flow channel for the travelling wind. The frame 110 has a belt-like upper wall and a belt-like lower wall that extends along the vehicle width direction, and belt-like side walls that connect the side ends of the upper and lower walls with each other. An opening 110a is provided in the bottom wall of the frame 110 so that an inserting portion 151 of the lower bracket 150 is inserted into the opening 110a. This will be described later in detail.

The louver blades 120 are moved between a closed position where the louver blades 120 are stood substantially vertically to close the interior of the frame 110 substantially and an open position where the louver blades 120 are disposed substantially horizontally not to block the airflow channel of the travelling wind in the interior of the frame 110 substantially. The louver blades 120 achieve the move by pivoting around a rotary axle extending along the vehicle width direction. When the louver blades 120 take the open position, as illustrated in FIG. 2, the rear end of the louver blades 120 project backward from the frame 110. When the louver blades 120 pivot by 90 degrees around the rotary axis in the counterclockwise direction from the open position, the louver blades 120 take the closed position and are substantially contained within the frame 110, as also illustrated in FIG. 2. In the example, two louver blades 120 are provided on the frame 110 in the vertical direction thereof.

The driver 130 drives the louver blades 120 so as to move the louver blades 120 between the closed position and the open position in response to a command signal from a controller (not illustrated). The driver 130 includes an actuator such as a motor, and a gear train that decreases an output speed of the actuator. As illustrated in FIG. 1, the driver 130 is disposed on the left side end of the frame 110, and the rear end of the driver 130 projects toward the vehicle backward further than the rear end of the frame 110. The whole of the driver 130 is disposed outside the radiator panel side member 30 in the vehicle width direction in an offset arrangement when the driver 130 is viewed from the vehicle front side. Even if the driver 130 moves backward together with the variable flow duct 100, as illustrated by two-dot chain lines in FIG. 1, the driver 130 passes the radiator panel side member 30 due to the above offset arrangement, whereby a collision between the driver 130 and the radiator panel side member 30 can be avoided.

The upper bracket 140 connects the upper portions of right and left side walls of the frame 110 with the lower portion of the bumper beam 50.

Figure 4A:
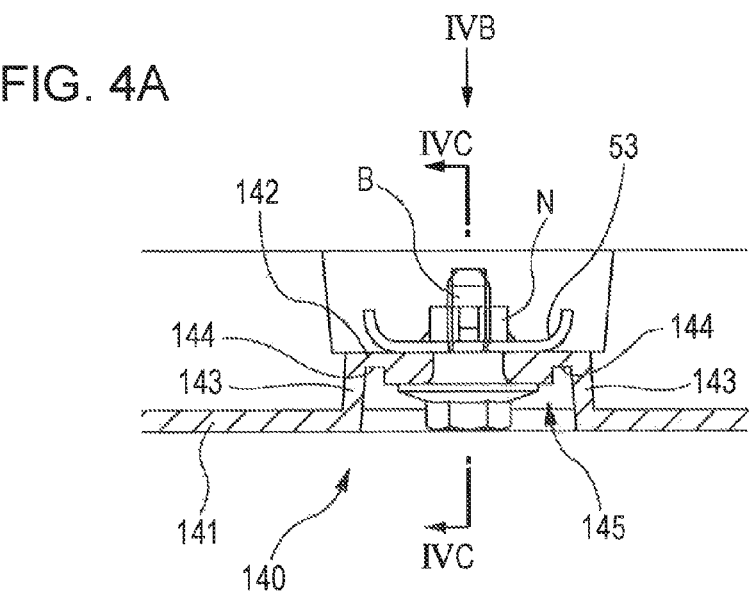
FIGS. 4A to 4C are three view drawings of an upper bracket in the attachment structure for the adjustable air diffuser according to the example of the invention.
Figure 4B:
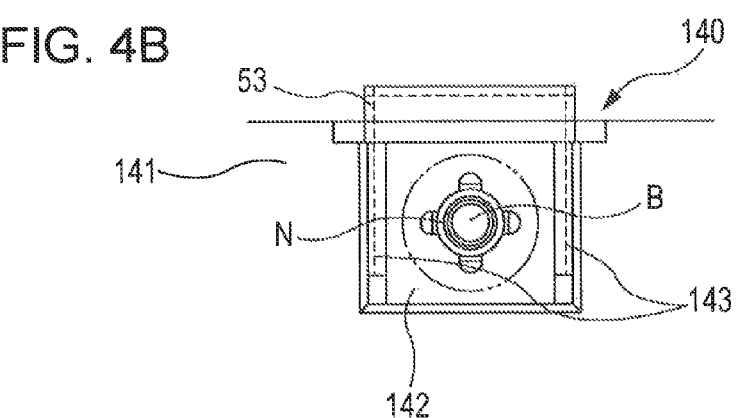
Figure 4C:
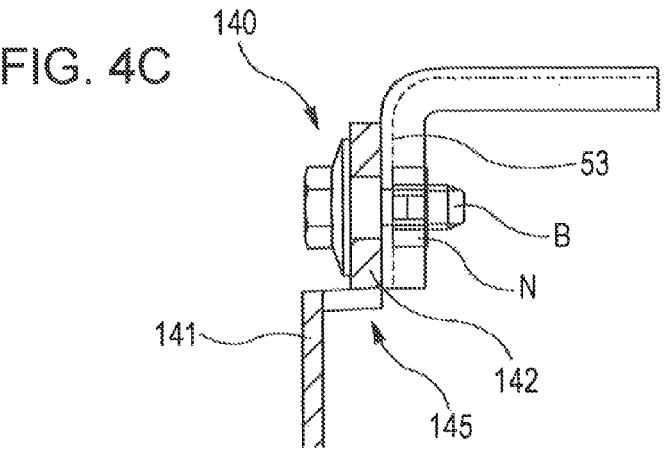

FIGS. 4A to 4C are three view drawings of an upper bracket in the attachment structure for the adjustable air diffuser according to the example of the invention: FIG. 4A is a top view, seen from above, of the upper bracket 140 in the attachment structure for the adjustable air diffuser; FIG. 4B is a plan view of the upper bracket 140, viewed along arrows IVB-IVB in FIG. 4A; and FIG. 4C is a cross sectional view of the upper bracket 140, viewed along arrows IVC-IVC in FIG. 4A.

The upper bracket 140 is made by injection-molding a resin-based material such as polypropylene (PP). The upper bracket 140 is attached to the frame 110 as a separate component from the frame 110 or integrated with the frame 110. As illustrated in FIG. 4A to FIG. 4C, the upper bracket 140 is secured to the bracket 53 provided on the lower wall of the bumper beam 50 with a bolt B. A nut N having a central axis that extends along the vehicle width direction is fixed to the bracket 53 by welding.

The upper bracket 140 includes a base wall 141, an attachment wall 142, side walls 143, grooves 144, a cut-out space 145, and the like. These segments are integrated with one another.

The base wall 141 is a flat plate-like wall that projects outward from the frame 110. The base wall 141 is disposed to face the vehicle front side.

The attachment wall 142 is a flat wall concaved in a stepped manner in the front-and-back direction of the vehicle. The attachment wall 142 is disposed to face the vehicle front side and is provided with an opening into which the bolt B is inserted.

The side walls 143 connect the right and left side ends of the attachment wall 142 with the base wall 141. The side walls 143 have flat plate-like shapes that extend along the fore-and-aft direction of the vehicle.

The grooves 144 are defined in the side ends of the attachment wall 142 (connecting portions between the attachment wall 142 and the side walls 143) so as to extend the vertical direction. A thickness of the attachment wall 142 is locally reduced at the areas of the grooves 144.

The cut-out space 145 is a recess (a gap) defined between the lower end of the attachment wall 142 and the base wall 141.

The cut-out space 145 allows the attachment wall 142 to be connected through only the side walls 143 to the base wall 141. Further, the grooves 144 which serve as the weak portions are provided between the attachment wall 142 and the side walls 143. With such a structure, when the bumper beam 50 and the variable flow duct 100 undergo a relative pivotal motion (a swing motion) over the predetermined angle around a central rotary axis extending substantially along the vehicle width direction, the upper bracket 140 is broken at the grooves 144. The upper bracket 140 is disposed near the connected portion between the bumper beam 50 and the front side frame 10 (inside the front side frame 10 with respect to a center in the vehicle width direction). Thus, in the case where the bumper beam 50 is bent into an arc-like shape due to a collision, the connected portion is subject to the least influence of displacement due to the bending deformation of the bumper beam 50.

The lower bracket 150 serves to connect the lower wall of the variable flow duct 100 to the EA bracket 60.

Figure 5A:
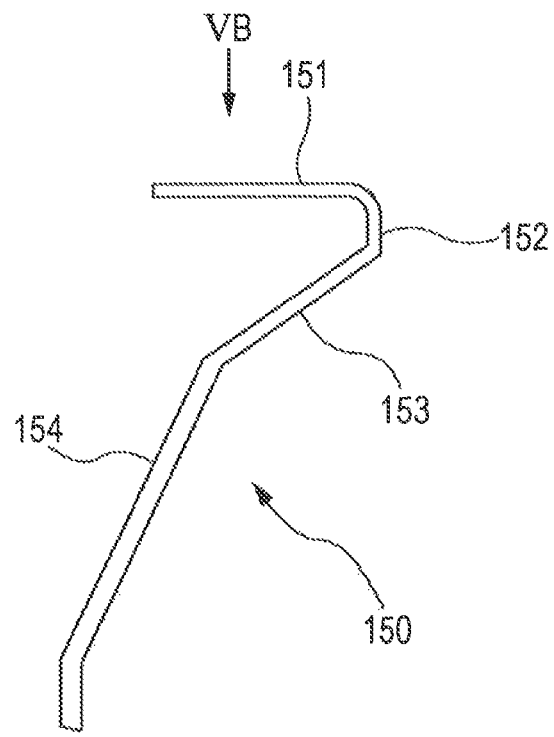
FIGS. 5A and 5B are two view drawings of a lower bracket in the attachment structure for the adjustable air diffuser according to the example of the invention.
Figure 5B:
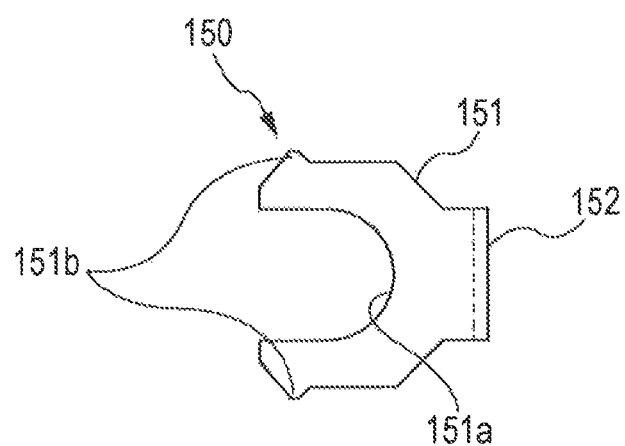

FIGS. 5A and 5B are two view drawings of a lower bracket in the attachment structure for the adjustable air diffuser according to the example of the invention: FIG. 5A is a top view, seen from above, of a lower bracket 150 in the attachment structure for the adjustable air diffuser example of the invention illustrated. FIG. 5B is a plan view of the lower bracket 150, viewed along arrows VB-VB in FIG. 5A.

The lower bracket 150 is made by bending and integrating a punched-out steel sheet, for instance. The lower bracket 150 includes an insertion wall 151, a bending wall 152, a coupling wall 153, an attachment wall 154, and the like. The insertion wall 151 is inserted into an opening 110a (see FIG. 2) provided in the lower wall of the frame 110 so as to join the insertion wall 151 to the frame 110. The opening 110a is defined in the rear end of the bottom wall of the frame 110 and extends toward the vehicle front side.

The insertion wall 151 has a groove 151a and hooks 151b. The groove 151a is defined by recessing the distal end of the insertion wall 151 into a U shape. The distal end of the insertion wall 151 is formed into a fork-like end by the groove 151a. The fork-like end can be elastically deformed in its width direction by utilizing the elasticity of the steel sheet.

Each of the hooks 151b projects outward from the side edge near the distal end of the insertion wall 151. Engagement protrusions (not illustrated) are provided on the opening 110a in the frame 110 so as to engage with the hooks 151b.

If a drawing force over the predetermined value is applied to the insertion wall 151 in the above structure, the insertion wall 151 is elastically deformed in a direction in which the interval of the hooks 151b is narrowed and the insertion wall 151 falls down from the opening 110a in the frame 110.

The bending wall 152 couples the rear end of the insertion wall 151 to the rear end of the coupling wall 153. As illustrated in FIG. 5A, the bending wall 152 is curved into, for instance, a semicircular shape when viewed from the vehicle width direction.

The coupling wall 153 has a belt-like shape and couples the bending wall 152 to the attachment wall 154. The coupling wall 153 is inclined so that the rear end (the upper end) of the coupling wall 153 is positioned higher than the front end (the lower end) of the coupling wall 153. The rear end. (the upper end) of the coupling wall 153 is connected with the bending wall 152. The front end (the lower end) of the coupling wall 153 is connected with the rear end of the attachment wall 154.

The attachment wall 154 is a belt-like flat plate to be secured to the EA bracket 60 and is provided with an aperture to receive the bolt B. The attachment wall 154 is inclined so that the rear end (the upper end) of the attachment wall 154 is higher than the front end (the lower end) of the attachment wall 154. The rear end (the upper end) of the attachment wall 154 is connected with the front end (the lower end) of the coupling wall 153. The attachment wall 154 is secured to the EA bracket 60 by screwing the bolt B into the nut N fixed on the EA bracket 60.

Next, behaviors of the members upon a collision in the example described above will be described.

Figure 6A:
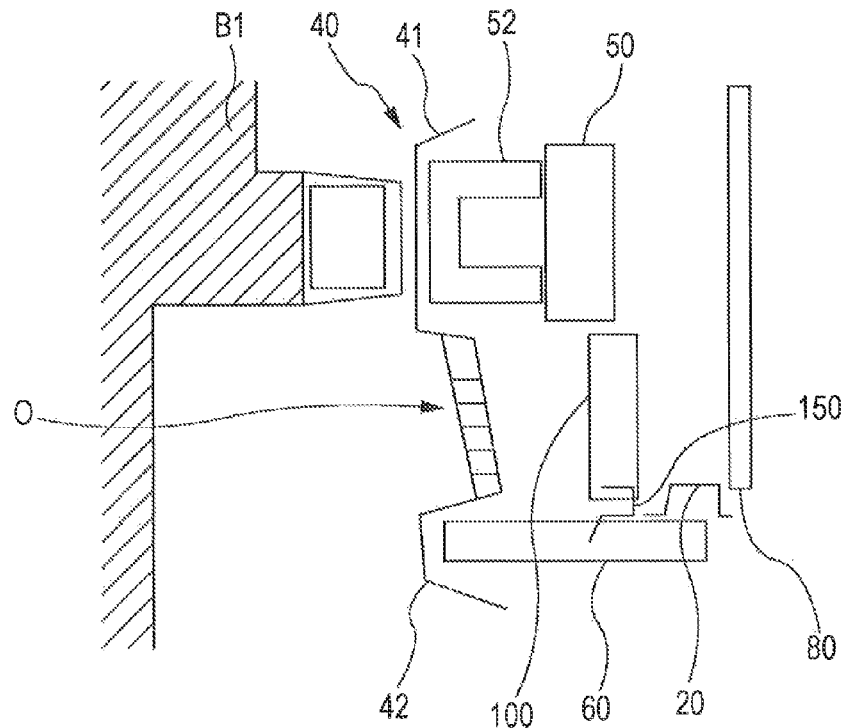
FIGS. 6A to 6B are explanatory views of the members in the attachment structure for the adjustable air diffuser according to the example of the invention, illustrating behaviors of the members in the attachment structure for the adjustable air diffuser according to the example of the invention when the vehicle provided with the attachment structure undergoes a head-on collision with a bumper of another vehicle.
Figure 6B:
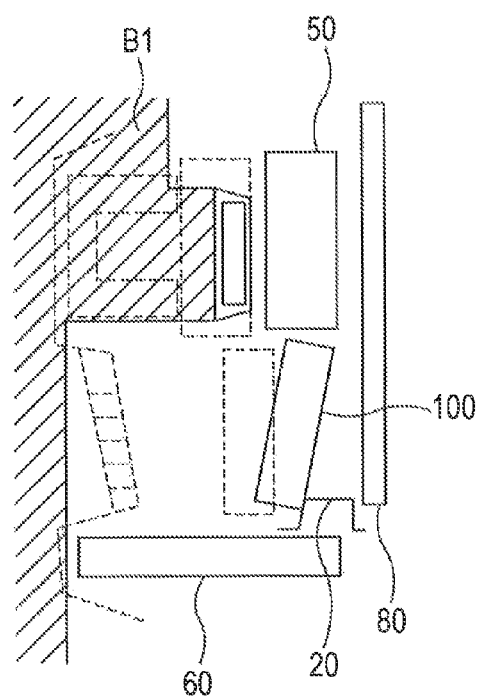

FIGS. 6A to 6B are explanatory views of the members in the attachment structure for the adjustable air diffuser according to the example of the invention, illustrating behaviors of the members in the attachment structure for the adjustable air diffuser according to the example of the invention when the vehicle provided with the attachment structure undergoes a head-on collision with a bumper of another vehicle. FIG. 6A illustrates the members immediately before the vehicle having the attachment structure undergoes a head-on collision with a front side of a barrier B1 that represents a bumper of another vehicle; FIG. 6B illustrates behaviors of the members after the vehicle having the attachment structure undergoes a head-on collision with the barrier B1.

As illustrated in FIGS. 6A and 6B, when the vehicle having the attachment structure undergoes the head-on collision with the other vehicle, the input load is substantially concentrated on the bumper beam 50 in the height direction thereof and is hardly applied to the EA bracket 60. In this case, the bumper beam 50 is bent and moved backward with respect to the other members of the vehicle such as the EA bracket 60.

On account of this behavior of the bumper beam 50, the variable flow duct 100 pivots around the lower bracket 150 so as to move the upper portion of the frame 110 backward (diagonally backward). If the upper bracket 140 undergoes torsional deformation over the predetermined angle because of the pivotal movement of the variable flow duct 100 relative to the lower bracket 150, the upper bracket 140 is broken at the grooves 144 that are the weak portions and an upper part of the variable flow duct 100 falls down from the bumper beam 50. As a result, the variable flow duct 100 enters a free state. Thus, the variable flow duct 100 is prevented from further moving backward from this state, thereby preventing the variable flow duct 100 from causing damage to cooling systems such as the radiator core 70 and the condenser 80. This can reduce the cost of repairing the vehicle and can enhance possibility the vehicle can run until it receives repair work. Also, since damage of the variable flow duct 100 can be suppressed, it may be possible to further reduce the repair cost by utilizing the variable flow duct 100 again in a process for repairing the vehicle.

Figure 7A:
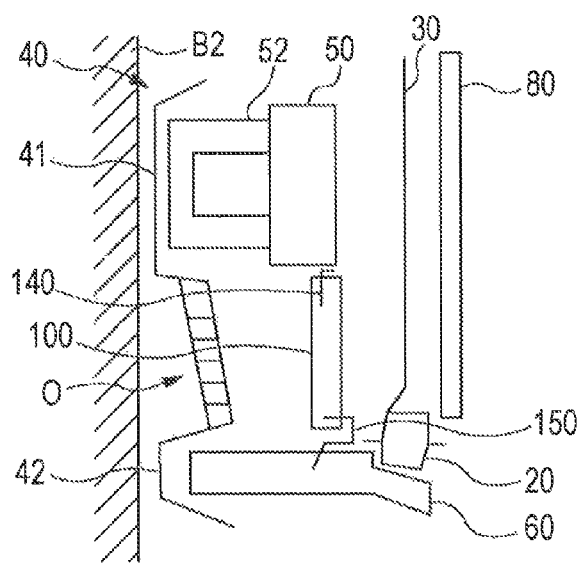
FIGS. 7A to 7C are an explanatory view of the members in the attachment structure for the adjustable air diffuser according to the embodiment of the invention, illustrating behaviors of the members in the attachment structure for the adjustable air diffuser according to the example of the invention when the vehicle provided with the attachment structure undergoes a head-on collision with a flat wall.
Figure 7B:
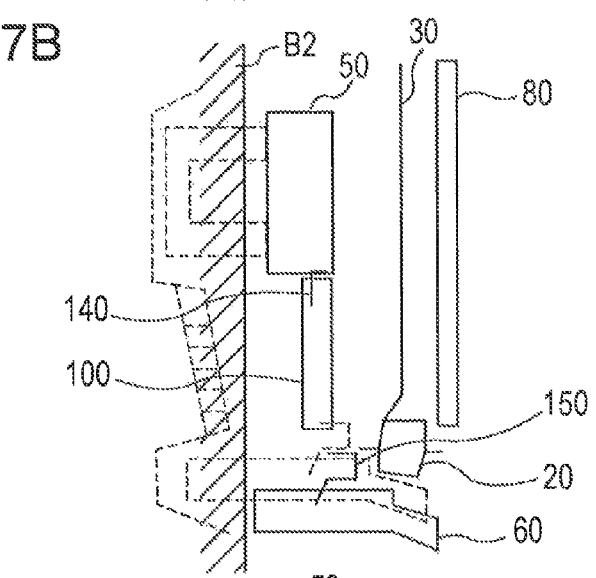
Figure 7C:
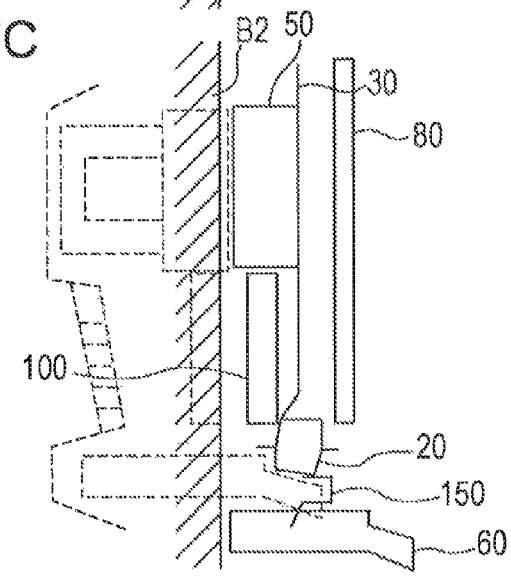

FIGS. 7A to 7C are explanatory views of the members in the attachment structure for the adjustable air diffuser according to the embodiment of the invention, illustrating behaviors of the members in the attachment structure for the adjustable air diffuser when the vehicle provided with the attachment structure undergoes a head-on collision with a flat wall: FIG. 7A illustrates the respective immediately before the vehicle undergoes a head-on collision with a flat barrier P2 that represents a flat wall or the like; FIG. 7B illustrates behaviors of the members in an initial state in which the vehicle undergoes the head-on collision with the flat barrier P2, and in which an energy absorption (EA) bracket 60 begins to move backward and a bumper beam 50 does not begin to move backward; FIG. 7C illustrates the behaviors of the members in a later state in which the vehicle undergoes the head-on collision with the flat barrier P2 and in which the bumper beam 50 moves backward.

As illustrated in FIG. 7B, the EA bracket 60 moves backward while passing under the radiator panel lower member 20 in response to the input load from the vehicle front side. At this time, since the EA bracket 60 moves backward with respect to the bumper beam 50, the insertion wall 151 of the lower bracket 150 is drawn out from the opening 110a and the lower bracket 150 is separated from the frame 110 of the variable flow duct 100. As a result, the lower part of the variable flow duct 100 enters a free state and the variable flow duct 100 is hung with the upper bracket 140 from the bumper beam 50.

As illustrated in FIG. 7C, when the barrier B2 further moves backward, the bumper beam 50 begins to move backward. At this time, the variable flow duct 100 moves backward along with the bumper beam 50. However, when a load over the predetermined value is applied to the upper bracket 140 due to interference with the other members, the upper bracket 140 is broken and upper and lower parts of the variable flow duct 100 enters a free state. Then, since the variable flow duct 100 is contained in the lower side of the bumper beam 50, the variable flow duct 100 does not project backward from the rear face of the bumper beam 50, and the frame 110 and the louver blades 120 do not cause damage to the tubes and fins of the condenser 80.

Figure 8:
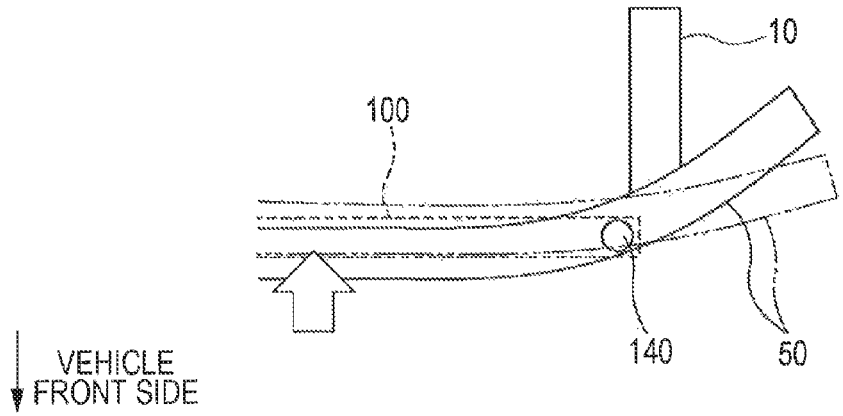
FIG. 8 is an explanatory plan view of the bumper beam in the attachment structure for the adjustable air diffuser according to the example of the invention upon a light collision.

FIG. 8 is an explanatory plan view of the bumper beam 50 in the attachment structure for the adjustable air diffuser according to the example of the invention, illustrating a behavior of the bumper beam 50 upon a light collision.

When a backward load is applied to the central part of the bumper beam 50, the bumper beam 50 is deformed so that the central part of the bumper beam 50 moves backward and opposite ends of the bumper beam 50 moves forward with respect to a fulcrum that is a connecting portion between the bumper beam 50 and the front side frame 10. Then, an area on the bumper beam 50 in the vicinity of the connecting portion between the bumper beam 50 and the front side frame 10 is displaced by the least amount relative to the other members of the vehicle in comparison with the other areas of the bumper beam 50. The upper bracket 140 is disposed on the least displacement area. Upon a light collision at a low vehicle speed of for instance, 5 km/h or lower, if a torsional deformation caused in the upper bracket 140 is relatively small, the upper bracket 140 is elastically deformed, so that the upper bracket 140 can be prevented from being damaged and the variable flow duct 100 can be prevented from falling down from the bumper beam 50. As a result, it is possible to reduce the cost of repairing the vehicle.

Figure 9:
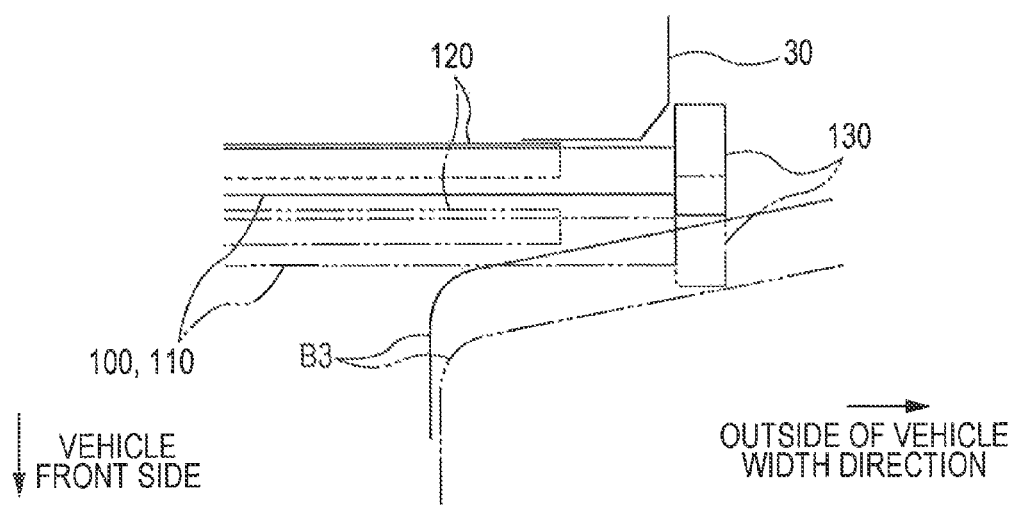
FIG. 9 is an explanatory plan view of a variable flow duct in the attachment structure for the adjustable air diffuser according to the example of the invention, illustrating the variable flow duct that moves backward.

FIG. 9 is an explanatory plan view of a variable flow duct 100 in the attachment structure for the adjustable air diffuser according to the example of the invention, illustrating a behavior of the variable flow duct 100 that moves backward.

FIG. 9 illustrates that a barrier B3 for an offset collision experiment applies an input load to the left half part of the bumper beam 50. The variable flow duct 100 in a state before a collision is illustrated by two-dot chain lines for reference.

In the case of a collision in which the variable flow duct 100 cannot be prevented from falling down or moving back as illustrated in FIG. 7C, the driver 130 for the variable flow duct 100 moves backward to the area outside the radiator panel side member 30 in the vehicle width direction. As a result, it is possible to prevent a collision between the driver 130 and the radiator panel side member 30, and it is also possible to prevent the radiator panel side member 30 from being damaged.

As described above, the invention can obtain the following effects:

(1) When the vehicle collides with the bumper of another vehicle and the bumper beam 50, to which the upper part of the variable flow duct 100 is attached, moves backward with respect to the vehicle body, the upper bracket 140 is broken in response to the backward inclination of the variable flow duct 100, thereby preventing the backward movement of the variable flow duct 100 from causing damage to the other members such as the condenser 80;

(2) When the EA bracket 60 moves backward upon a collision onto a wall face or the like, the lower bracket 150 is separated from the frame of the variable flow duct 100 so that the variable flow duct 100 moves backward along with the EA bracket 60. As a result, it is possible to prevent the lower bracket 150 from causing damage to the other members such as the condenser 80;

(3) The upper bracket 140 is disposed near the connecting portion between the bumper beam 50 and the front side frame 10. Therefore, even if the bumper beam 50 is deformed into an arc-like shape due to a light collision, the deformation of the upper bracket 140 is suppressed at the connecting portion, thereby preventing the variable flow duct 100 and the upper bracket 140 from being damaged;

(4) Since the rear ends of the louver blades 120 come into contact with the radiator panel side member 30 when the variable flow duct 100 moves backward, the louver blades 120 pivot to the closed position or the louver blades 120 are broken by the interference between the louver blades 120 and the radiator panel side member 30, thereby preventing the rear end of the louver blades 120 from causing damage to the other member such as the condenser 80; and (5) The driver 130 for the variable flow duct 100 is disposed so as to be deviated from the radiator panel side member 30 in the vehicle width direction. Therefore, when the variable flow duct 100 moves backward, it is possible to prevent the driver 130 from interfering with the radiator panel side member 30 and causing damage to the radiator panel side member 30.

The invention is not limited to the example described above. Various modifications and alterations can be performed in the invention, which are also within the technical scope of the invention.

For instance, shapes, structures, materials, producing methods, arrangements, and numbers of the members that constitute the adjustable air diffuser are not limited to the above example and can be altered, as required.

Also, although the lower bracket of the adjustable air diffuser is attached to the EA bracket (the load transmission member), the invention is not limited to this structure. The lower bracket may be attached to another vehicle structural member such as the radiator panel lower member.

The invention claimed is:

1. An attachment structure for an adjustable air diffuser, the adjustable air diffuser being disposed in an airflow channel configured for introduction of travelling wind directed through an opening provided in a bumper face, and the adjustable air diffuser being configured for substantially opening and closing the airflow channel by using a movable louver blade driven by an actuator, wherein
- an upper part of the adjustable air diffuser is disposed to face a rear wall of the bumper face and is attached to a bumper beam extending substantially along a vehicle width direction;
- a lower part of the adjustable air diffuser is attached to either one of a vehicle body structural member and a load transmission member projecting forward from the vehicle body structural member;
- the upper part of the adjustable air diffuser and the bumper beam are connected with each other through an upper bracket having a weak portion that is configured to be broken in response to pivotal movement of the adjustable air diffuser that displaces the adjustable air diffuser relative to the bumper beam, and
- the lower part of the adjustable air diffuser is connected with the either one of the vehicle body structural member and the load transmission member through a lower bracket that is configured to be separated from the either one of the vehicle body structural member and the load transmission member in response to backward movement of the either one of the vehicle body structural member and the load transmission member relative to the adjustable air diffuser.

2. The attachment structure for the adjustable air diffuser according to claim 1, wherein
the upper bracket connecting the upper part of the adjustable air diffuser and the bumper beam is disposed near a connecting portion between a vehicle frame and the bumper beam.

3. The attachment structure for the adjustable air diffuser according to claim 1, wherein
- the adjustable air diffuser includes a movable louver blade that pivots around an axis extending substantially along a vehicle width direction and a part of which projects backward when the movable louver blade is disposed in an open position; and
- an end of the movable louver blade in the vehicle width direction is disposed so as to overlap a supporting member that supports at least either one of a side end of a radiator core and a side end of a condenser for an air conditioner in a vehicle width direction.

4. The attachment structure for the adjustable air diffuser according to claim 1, wherein
- the adjustable air diffuser includes a driver a part of which projects backward; and
- the driver is disposed at a position substantially deviated from a supporting member that supports at least either one of a side end of a radiator core and a side end of a condenser for an air conditioner in a vehicle width direction.

5. An attachment structure for an adjustable air diffuser, the adjustable air diffuser being disposed in an airflow channel configured for introduction of travelling wind directed through an opening provided in a bumper face, and the adjustable air diffuser being configured for substantially opening and closing the airflow channel by using a movable louver blade driven by an actuator, wherein
- an upper part of the adjustable air diffuser is disposed to face a rear wall of the bumper face and is attached to a bumper beam extending substantially along a vehicle width direction;
- a lower part of the adjustable air diffuser is attached to either one of a vehicle body structural member and a load transmission member projecting forward from the vehicle body structural member; and
- the lower part of the adjustable air diffuser is connected with the either one of the vehicle structural member and the load transmission member through a lower bracket that is configured to be separated from the either one of the vehicle structural member and the load transmission member in response to backward movement of the either one of the vehicle structural member and the load transmission member relative to the adjustable air diffuser, and
- wherein the adjustable air diffuser includes a movable louver blade that pivots around an axis extending substantially along a vehicle width direction and a part of which projects backward when the movable louver blade is disposed in an open position; and
- an end of the movable louver blade in the vehicle width direction is disposed so as to overlap a supporting member that supports at least either one of a side end of a radiator core and a side end of a condenser for an air conditioner in a vehicle width direction.

6. The attachment structure for the adjustable air diffuser according to claim 5, wherein
a connecting portion between the upper part of the adjustable air diffuser and the bumper beam is disposed further inside a vehicle frame, with respect to a center in a vehicle width direction, relative to a connecting portion between the vehicle frame and the bumper beam.

7. The attachment structure for the adjustable air diffuser according to claim 5, wherein
- the adjustable air diffuser includes a driver a part of which projects backward; and
- the driver is disposed at a position substantially deviated from a supporting member that supports at least either one of a side end of a radiator core and a side end of a condenser for an air conditioner in a vehicle width direction.

8. An attachment structure for an adjustable air diffuser, the adjustable air diffuser being disposed in an airflow channel configured for introduction of travelling wind directed through an opening provided in a bumper face, and the adjustable air diffuser being configured for substantially opening and closing the airflow channel by using a movable louver blade driven by an actuator, wherein
- an upper part of the adjustable air diffuser is disposed to face a rear wall of the bumper face and is attached to a bumper beam extending substantially along a vehicle width direction;
- a lower part of the adjustable air diffuser is attached to either one of a vehicle body structural member and a load transmission member projecting forward from the vehicle body structural member;
- the upper part of the adjustable air diffuser and the bumper beam are connected with each other through an upper bracket having a weak portion that is configured to be broken in response to pivotal movement of the adjustable air diffuser that displaces the adjustable air diffuser relative to the bumper beam; and
- the lower part of the adjustable air diffuser is connected to either one of the vehicle body structural member and the load transmission member through a lower bracket that includes an insertion wall, and
- wherein the insertion wall is inserted into an opening which is defined in a rear end of a bottom wall of the lower part of the adjustable air diffuser and extends toward the vehicle front side so as to join the insertion wall and the opening, and wherein a distal end of the insertion wall is formed into a fork-like end and is elastically deformable in order to separate from the insertion wall.

9. The attachment structure for the adjustable air diffuser according to claim 8, wherein
the upper bracket connecting the upper part of the adjustable air diffuser and the bumper beam is disposed near a connecting portion between a vehicle frame and the bumper beam.

10. The attachment structure for the adjustable air diffuser according to claim 8, wherein
the adjustable air diffuser includes a movable louver blade that pivots around an axis extending substantially along a vehicle width direction and a part of which projects backward when the movable louver blade is disposed in an open position; and
an end of the movable louver blade in the vehicle width direction is disposed so as to overlap a supporting member that supports at least either one of a side end of a radiator core and a side end of a condenser for an air conditioner in a vehicle width direction.

11. The attachment structure for the adjustable air diffuser according to claim 8, wherein
the adjustable air diffuser includes a driver a part of which projects backward; and
the driver is disposed at a position substantially deviated from a supporting member that supports at least either one of a side end of a radiator core and a side end of a condenser for an air conditioner in a vehicle width direction.

12. The attachment structure for the adjustable air diffuser according to claim 8, wherein
a connecting portion between the upper part of the adjustable air diffuser and the bumper beam is disposed further inside a vehicle frame, with respect to a center in a vehicle width direction, relative to a connecting portion between the vehicle frame and the bumper beam.

13. The attachment structure for the adjustable air diffuser according to claim 8, wherein
the adjustable air diffuser includes a movable louver blade that pivots around an axis extending substantially along a vehicle width direction and a part of which projects backward when the movable louver blade is disposed in an open position; and
an end of the movable louver blade in the vehicle width direction is disposed so as to overlap a supporting member that supports at least either one of a side end of a radiator core and a side end of a condenser for an air conditioner in a vehicle width direction.

* * * * *